(12) United States Patent
Takizawa et al.

(10) Patent No.: US 7,831,315 B2
(45) Date of Patent: Nov. 9, 2010

(54) METHOD FOR CONTROLLING SEMICONDUCTOR-PROCESSING APPARATUS

(75) Inventors: Masahiro Takizawa, Tama (JP); Kazuyoshi Ishigaya, Tama (JP)

(73) Assignee: ASM Japan K.K., Tokyo (JP)

( * ) Notice: Subject to any disclaimer, the term of this patent is extended or adjusted under 35 U.S.C. 154(b) by 353 days.

(21) Appl. No.: 11/842,701

(22) Filed: Aug. 21, 2007

(65) Prior Publication Data

US 2009/0055013 A1    Feb. 26, 2009

(51) Int. Cl.
*G06F 19/00* (2006.01)
*G06F 1/12* (2006.01)

(52) U.S. Cl. ................ 700/11; 700/121; 700/20; 713/400; 713/600

(58) Field of Classification Search .......... 700/11, 700/121, 20; 713/500, 501, 600, 400
See application file for complete search history.

(56) References Cited

U.S. PATENT DOCUMENTS

| | | | | |
|---|---|---|---|---|
| 5,235,698 | A | * | 8/1993 | Lan .................... 713/501 |
| 6,128,312 | A | * | 10/2000 | Kurosawa ............ 370/465 |
| 6,516,422 | B1 | * | 2/2003 | Doblar et al. ........ 713/503 |
| 2006/0043202 | A1 | * | 3/2006 | Kim et al. ............ 235/492 |
| 2008/0147228 | A1 | * | 6/2008 | Fenner et al. ........ 700/121 |

\* cited by examiner

*Primary Examiner*—Albert DeCady
*Assistant Examiner*—Steven R Garland
(74) *Attorney, Agent, or Firm*—Knobbe, Martens, Olson & Bear, LLP

(57) ABSTRACT

A method controls an apparatus such as a semiconductor-processing apparatus including a controller and at least one device controlled by the controller, wherein the controller is provided with an interface for communicating with the device, and the interface has an internal clock for measuring time intervals for the communication. The method includes: replacing a system clock of the controller's operating system, which is used for transmitting instructions to the interface, with the internal clock of the interface; transmitting instructions to the interface from the controller using the time intervals measured by the internal clock substituting the system clock; and transmitting the instructions to the device from the interface using the time intervals measured by the internal clock in the interface, thereby controlling the device.

8 Claims, 3 Drawing Sheets

METHOD FOR CONTROLLING SEMICONDUCTOR-PROCESSING APPARATUS

BACKGROUND OF THE INVENTION

1. Field of the Invention

The present invention relates to a controller constituting a semiconductor manufacturing apparatus, as well as a control method.

2. Description of the Related Art

Control accuracy of semiconductor manufacturing apparatuses is an important factor in the production of semiconductor wafers. Here, "control accuracy" refers to the margin of error in the time interval cycles in which, for example, opening/closing of a valve is controlled. For example, a control that was implemented in 50-ms cycles using a Microsoft Windows® operating system produced an error of approx. 50 ms±20 ms in terms of instructions actually output.

To reduce this error, a software program called "RTX" (real time extension) by Ardence can be incorporated into a Windows® operating system. When the two are combined, the error deceases to approx. 50 ms±1 ms.

However, RTX is an expensive product (costing approx. 5,000,000 yen), and therefore using it inevitably adds to the apparatus cost. Also, even when the cycle error of the operating system is reduced to ±1 ms, the inability to synchronize with the clock of the input/output control interface that receives the applicable instructions still results in an error of approx. ±1 ms. Consequently, there is always an error of 50 ms±2 or 3 ms.

In recent years, however, the trend for finer processing of semiconductor wafers is requiring that semiconductor manufacturing apparatuses be controlled in a manner not producing even 2 or 3 ms of error.

SUMMARY OF THE INVENTION

To solve the aforementioned problem, the apparatus or method proposed by the present invention controls the input/output devices using the clock provided by the PCI board for digital data communication included in the controller, instead of the clock provided by the operating system of the controller, to implement more accurate control subject to an error of just 50 ms±1 ms. The present invention also provides the secondary benefit of keeping the apparatus cost low.

In an embodiment, the present invention provides an apparatus or method, wherein the apparatus (preferably a semiconductor manufacturing apparatus) comprises a controller and a controlled device (in an embodiment multiple controlled devices are used and preferably arranged in parallel with the flow of signals) and the controller includes a PCI board or the like for implementing data communication with the controlled device, so that the clock of the PCI board is used to implement accurate control.

In another embodiment, the control is a cyclical control.

In yet another embodiment, the PCI board is a DeviceNet data communication board. In the foregoing embodiment, the DeviceNet data communication board is constituted by, for example, 3G8F7-DRM21 by Omron.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

DETAILED DESCRIPTION OF THE PREFERRED EMBODIMENT

Figure 1:
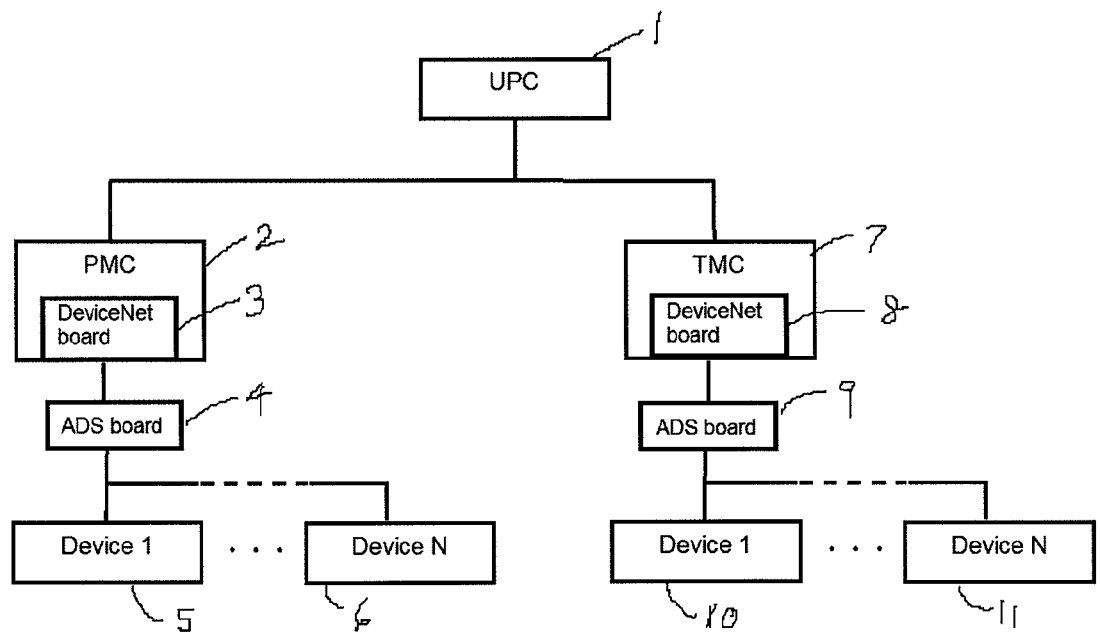
FIG. 1 is a schematic diagram of a general control system used in a plasma CVD apparatus according to an embodiment of the present invention.

The present invention will be explained in details with reference to preferred embodiments. However, the preferred embodiments are not intended to limit the present invention.

According to an embodiment, the present invention provides a method for controlling an apparatus comprising a controller and at least one device controlled by the controller, said controller being provided with an interface for communicating with the device, said interface having an internal clock for measuring time intervals for the communication, said method comprising: (i) replacing a system clock of the controller's operating system, which is used for transmitting instructions to the interface, with the internal clock of the interface; (ii) transmitting instructions to the interface from the controller using the time intervals measured by the internal clock substituting the system clock; and (iii) transmitting the instructions to the device from the interface using the time intervals measured by the internal clock in the interface, thereby controlling the device.

In an embodiment, the instructions may be transmitted to the interface in cycles.

In any one of the aforesaid embodiments, the at least one device may denote multiple devices arranged in parallel with respect to the interface.

In any one of the aforesaid embodiments, the interface may be a PCI board.

In any one of the aforesaid embodiments, the PCI board may be a communication board for a DeviceNet system which connects the multiple devices.

In any one of the aforesaid embodiments, the apparatus may be a semiconductor-processing apparatus.

In any one of the aforesaid embodiments, the controller may be a controller which controls executing recipes or a controller which controls executing wafer transfer.

In any one of the aforesaid embodiments, the apparatus may further include at least another controller and a main controller which controls the controller and the other controller, said method further comprising controlling the controller and the other controller by the main controller.

In any one of the aforesaid embodiments, the controller may be a controller which controls executing recipes and the other controller may be a controller which controls executing wafer transfer.

In any one of the aforesaid embodiments, the main controller and the controller/the other controller may be connected via the Ethernet.

In another embodiment, the present invention provides a method for controlling a semiconductor-processing apparatus comprising a main controller, at least one sub-controller provided with a PCI board, and at least one device, wherein the main controller controls the sub-controller which controls the device, said method comprising: (i) initializing time interval settings of cyclic instructions of the sub-controller, which settings control input/output of signals from/to the PCI board, by using an API provided by the PCI board for an internal clock of the PCI board; (ii) controlling input/output of signals between the sub-controller and the PCI board by using the API provided by the PCI board; and (iii) controlling input/output of signals between the PCI board and the device by using the API provided by the PCI board.

In any one of the aforesaid embodiments, the at least one device may denote multiple devices arranged in parallel with respect to the PCI board.

In any one of the aforesaid embodiments, the PCI board may be a communication board for a DeviceNet system which connects the multiple devices.

In any one of the aforesaid embodiments, the at least one sub-controller may denote a sub-controller performing recipe control.

In any one of the aforesaid embodiments, the at least one sub-controller may denote multiple sub-controllers.

In any one of the aforesaid embodiments, the main controller and the sub-controller may be connected via the Ethernet.

In an embodiment, the control of instructions to the PCI board (signal input/output control) for implementing data communication between the controller and controlled device is performed using the built-in clock of the PCI board. For your information, the clock of the controller's operating system is also used for purposes other than apparatus control inside the controller (such as a module controller PC), and it is basically different from the built-in clock (also called "internal clock") of the PCI board. The clock performance of an operating system (such as Windows®) is reduced by certain drawbacks of the operating system, such as the difficulty linking the application software and system timers in the case of Windows®, which is not a real-time operating system. RTX is used to compensate for these drawbacks. Even when RTX is used, however, the synchronization problem of the PCI board that implements data communication with the operating system and the network of controlled devices (such as DeviceNet), makes generation of error inevitable.

On the other hand, use of the built-in clock of the PCI board to control instructions to the PCI board (control signal input/outputs) eliminates the problems of inaccurate operating system cycles and poor synchronization with the input/output devices, thereby allowing the error to be reduced without fail regardless of the clock performance of the PCI board.

Although the effectiveness of this type of control is maximized when the applicable control is a cyclical control, it can be used for any type of control. For your reference, the PCI board is not limited to a specific type, but any PCI board can be used as long as it provides a favorable communication interface.

In an embodiment, the PCI board is a DeviceNet data communication board, in which case the precondition is that the controlled device of the semiconductor manufacturing apparatus is required to be linked by a DeviceNet network and communicate over the network. In other words, each control means after (downstream of) the controller performs DeviceNet communication. In addition to PCI boards for DeviceNet communication, RS232C (serial communication), SCSI and GPIB boards can be used, for example. SCSI implements parallel communication, while GPIB is a serial communication interface similar to RS232C and RS422. Among DeviceNet data communication boards, 3G8F7-DRM21 by Omron can be used, for example.

Embodiments of the present invention are explained in details using drawings. It should be noted, however, that the present invention is not at all limited to these drawings or embodiments.

FIG. 1 is a schematic diagram showing an example of a control configuration for semiconductor manufacturing apparatus. This apparatus comprises the controllers listed below.

UPC (Unique Platform Controller) 1: Main controller

PMC (Process Module Controller) 2: Process module controller

TMC (Transfer Module Controller) 7: Transfer module controller

PMC2 is a sub-controller that performs controls relating to the processing container (chamber), while TMC7 is a sub-controller that performs controls relating to wafer transfer (robot). These sub-controllers are controlled by a main controller UPC1.

In FIG. 1, device 1 (5, 10) through device N (6, 11) each represent, for example, a control means such as a gas flow-rate controller (MFC) or pressure control valve (throttle valve) in the case of PMC2. PMC2 and TMC7 also have a built-in DeviceNet board 3, 8, respectively. These DeviceNet boards are interface boards for directly communicating with the input/output devices (I/Os) such as sensors and valves located at the end of devices (control means). Representative DeviceNet boards include 3G8F7-DRM21 by Omron.

PMC2 and TMC7 also have an ADS board 4, 9 connected between themselves and the control means, respectively. These ADS boards 4, 9 convert analog signals from sensors, etc., into digital signals, and converted digital signals are input to the DeviceNet board 3, 8.

Figure 2:
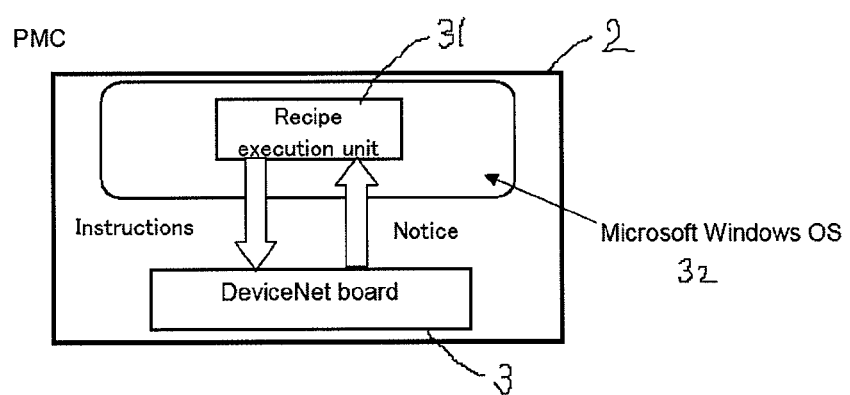
FIG. 2 is a schematic diagram showing signal flow in a module of the plasma CVD apparatus according to an embodiment of the present invention.

Next, take a look at PMC2 in FIG. 1. As illustrated in FIG. 2, software of the recipe execution unit 31 operates in the operating system in the controller and issues instructions to the input/output devices via the DeviceNet board 3, while also receiving notifications from the input/output devices via the DeviceNet board 3.

Figure 3:
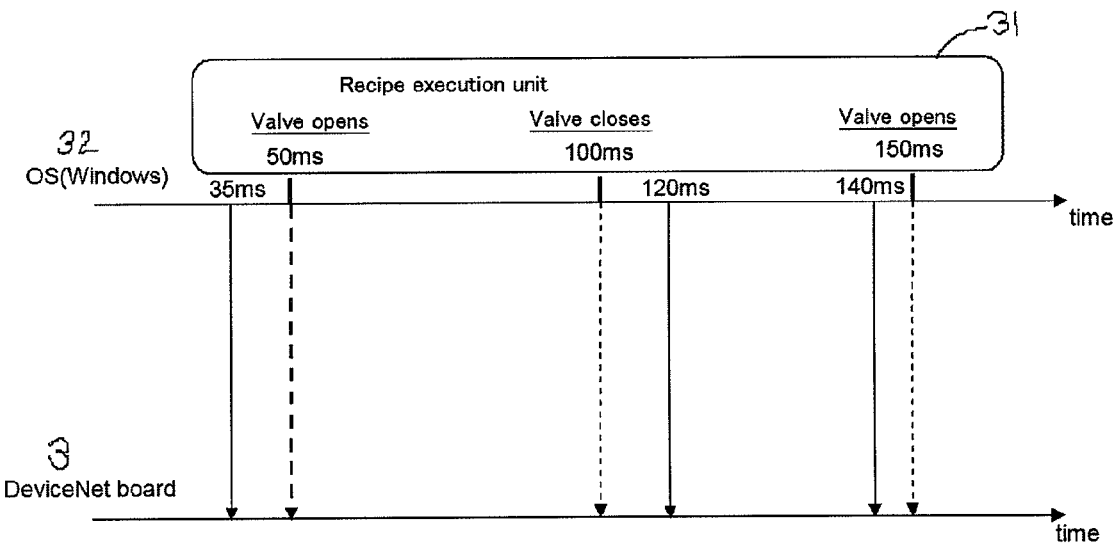
FIG. 3 is a schematic diagram showing controlling operation when conducting control in cycles using a system clock provided by an operating system of a conventional controller.

Here, a valve is used as an example of input/output device to explain a control method for a film type process where a valve needs to be opened/closed in 50-ms cycles. In this case, the recipe execution unit 31 in FIG. 2 instructs the DeviceNet board 3 to open/close the valve in 50-ms cycles. If the operating system of PMC2 is Microsoft Windows®, however, the 50-ms open/close instructions are actually transmitted to the DeviceNet board 3 as instructions subject to a cycle error of approx. 50 ms±20 ms. This condition is shown in FIG. 3. The horizontal axis represents time, and how instructions are transmitted to the DeviceNet board 3 from an operating system 32 of PMC2 is shown. The dotted lines indicate correctly transmitted instructions, while the solid arrows are instructions that may occur in reality. As shown, it takes 85 ms (120 ms-35 ms) after the first "open" instruction is issued until the next "close" instruction is issued. However, it takes only 20 ms (140 ms-120 ms) thereafter until the second "open" instruction is issued. This suggests that using a Microsoft Windows® operating system alone cannot control the control means accurately (in terms of time).

Figure 4:
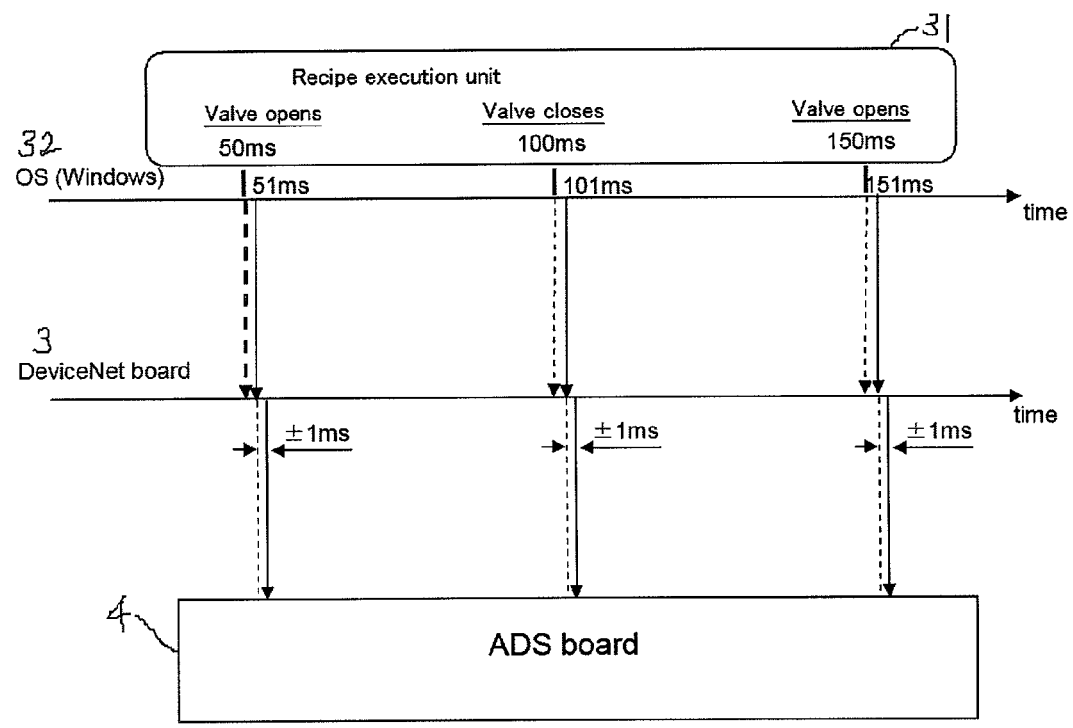
FIG. 4 is a schematic diagram showing controlling operation when conducting control in cycles using "RTX" (real time extension software) incorporated in the conventional controller.

When a software program called "RTX" by Ardence is incorporated into a Windows® operating system, the Windows® operating system gains real-time operating characteristics. In the aforementioned example, RTX can reduce the error from approx. ±20 ms to ±1 ms with respect to 50-ms instructions. How this happens is shown in FIG. 4. When this figure is compared to FIG. 3, it is evident that the accuracy of time intervals in which valve opening/closing is instructed is much higher.

However, an error of approx. 1 ms may still occur after an instruction is received by the DeviceNet board 3 until the instruction actually reaches the ADS board 4 (input/output device), as shown at the bottom of FIG. 4. Because the DeviceNet board 3 accesses the ADS board 4 and input/output device based on its own cycles (clock), the operating system cannot be synchronized with the DeviceNet board 3. As a result, an error of ±2 or 3 ms with respect to the recipe execution unit remains.

Figure 5:
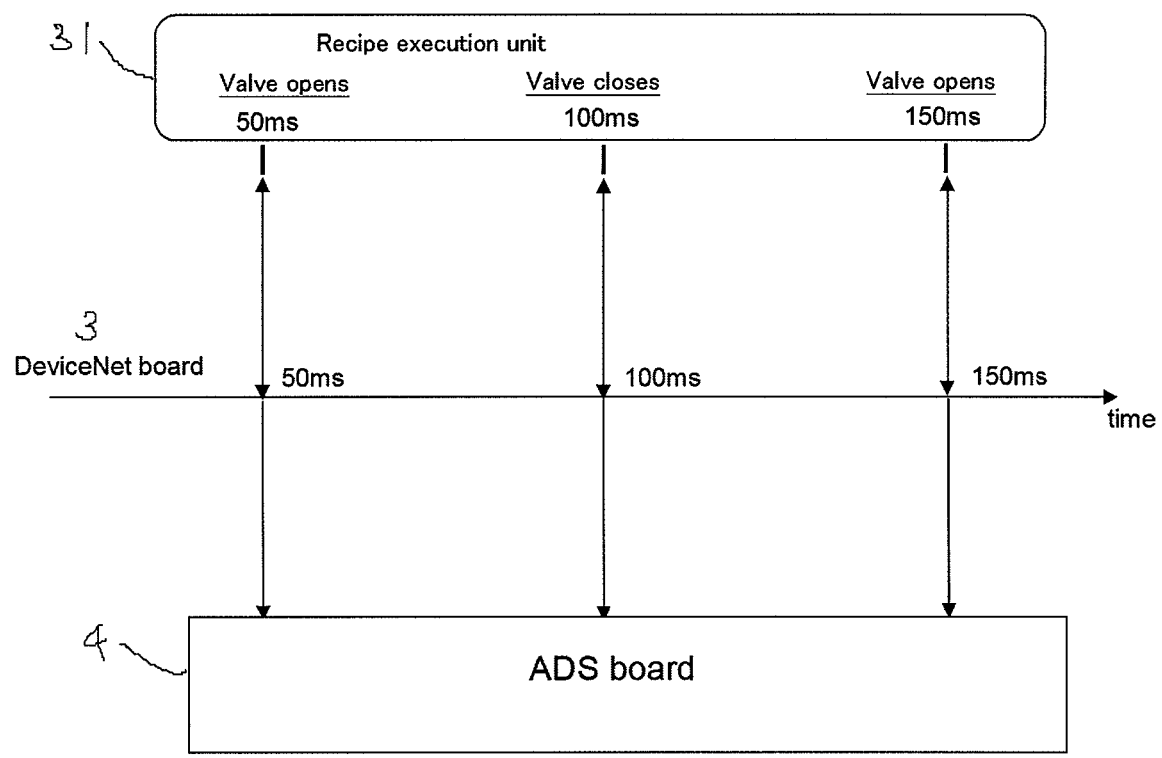
FIG. 5 is a schematic diagram showing controlling operation when conducting control in cycles using an internal clock provided by a PCI board for data transmission according to an embodiment of the present invention.

For this reason, the recipe execution unit can use the clock (built-in clock or internal clock) of the DeviceNet board 3, instead of the clock provided by PMC 31 (Windows®), in order to solve the problems of inaccurate cycles of the operating system 32 and poor synchronization with the input/output devices. How this is done is shown in FIG. 5. The recipe execution unit 31 uses the clock provided by the DeviceNet board 3 (upward arrows) to issue valve open/close instructions (downward arrows). The DeviceNet board 3 issues actual instructions to the ADS board 4 (input/output device) based on its own clock cycles.

In this example, the clock of the DeviceNet board 3 is subject to an error of approx. ±1 ms with respect to the 50-ms cycle. However, this is the maximum value of cyclical error that can occur in this example.

To specifically apply the method described above, in an embodiment the cycle time settings are initialized using the API function SCAN_SetScanTimeValue( ) provided by the driver software of the DeviceNet Board 3, instead of using WMTimer( ), Sleep( ), SetWaitableTimer( ) and TimeSetEvent( ) or other API function provided by the Windows® operating system used by the application software (such as the recipe execution unit 31), and the message processing function of Windows® is used via SCAN_RegScanEvtNotifyMessage( ). It is considered that API functions are used not for communication purposes, but for initialization of cycle time settings and (cyclical) input/output control of control signals. Therefore, the exchange of signals between the recipe execution unit 31 and DeviceNet board 3 constitutes the relationship of "instruction" and "notification" (FIG. 2) which is irrelevant to API functions. By replacing the API functions provided by the operating system involved in signal input/output control, with the API functions provided by the DeviceNet board, the recipe execution unit 31 and the driver of the DeviceNet board 3 can perform signal input/output control using the same API functions.

In the aforementioned example, the API functions of the signal input/output control software in the recipe execution unit as the application software were replaced. However, it is also possible to replace the API functions of other unit that implements cyclical control, such as the I/O control unit or time management unit. For your reference, the I/O control unit is where I/Os (inputs/outputs) are monitored and output requests issued periodically, while the time management unit is in charge of managing the timers used by the application.

In addition to the above, API functions that are used in the initialization process include, but not limited to, the functions listed below:

```
MMF_WATCH->bModuleUse[MDL_DNADS]=TRUE;
MMF_WATCH->nModuleCond[MDL_DNADS]=
MDL_COND_DEAD;
DnAns = m_Ads.Init(BOARDID_MASTER);
if (DnAns) DnAns = m_Ads.SetScanTimeValue(SCANCYCLE);
if (DnAns) DnAns = m_Ads.GetScanTimeValue(&STime);
if     (DnAns)    DnAns    =
m_Ads.RegScanEvtNotifyMessage(0,hWnd,WM_DNADS);
if (DnAns) DnAdsActive =TRUE;
else m_Ads.GetLastErrorString(errstr);
if(DnAdsActive)MMF_WATCH-
nModuleCond[MDL_DNADS]=MDL_COND_IDLE;
else           MMF_WATCH-
>nModuleCond[MDL_DNADS]=MDL_COND_READY.
```

In the replacement of API functions of the operating system, the following functions can also be used, among others:

API function relating to the signal input unit:

DnAns=m_Ads.GetInData(&InD, TRUE):

API function relating to the signal output unit:

DnAns=m_Ads.SetOutData(&OutD, TRUE):

Here, the input unit and output unit are where input/output requests from the device (control means) are issued to the DeviceNet board. Specifically, the input unit reads input values from the control means, while the output unit sets output values to the control means.

With operating systems other than Windows®, such as Mac and Linux, API functions can be replaced in a similar manner if the applicable PCI board (communication interface) provides API functions for the corresponding operating system.

Based on the above, in an embodiment of the present invention the input/output devices can be controlled in a cycle of, for example, 50 ms±1 ms, without incurring additional cost, by controlling the input/output devices using the clock of the data communication PCI board included in the controller, instead of the clock provided by the operating system of the controller.

In the present disclosure where conditions and/or structures are not specified, the skilled artisan in the art can readily provide such conditions and/or structures, in view of the present disclosure, as a matter of routine experimentation.

The present invention includes the above mentioned embodiments and other various embodiments including the following:

1) A method for controlling a semiconductor manufacturing apparatus comprising a controller and at least one controlled device controlled by the controller, where the controller is provided with a PCI board for communicating with the controlled device, while the PCI board has an internal clock to measure time intervals; wherein the method comprises controlling the controlled device by issuing cyclical instructions from the controller to the controlled device using time intervals based on the internal clock of the PCI board.

2) A method according to 1) above, wherein the at least one controlled device denotes multiple devices.

3) A method according to 1) above, wherein the step of using time intervals based on the internal clock includes a step of using API functions provided by the PCI board of the controller.

4) A method for controlling a semiconductor manufacturing apparatus comprising a main controller, at least one sub-controller with a PCI board, and at least one device, where the sub-controller controls the device, while the main controller controls the sub-controller; wherein the method comprises using API functions provided by the PCI board to initialize the cycle time settings used in signal input/output control and also controlling the signal inputs/outputs of the device using API functions provided by the PCI board.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method for controlling an apparatus comprising a controller and at least one device controlled by the controller, said controller being provided with an interface for communicating with the at least one device, said interface having an internal clock for measuring time intervals for the communication, said method comprising:

replacing the internal clock in place of a system clock of an operating system of the controller, which is used for transmitting instructions to the interface, with the internal clock of the interface;

transmitting instructions to the interface from the controller using the time intervals measured by the internal clock substituting for the system clock; and transmitting the instructions to the at least one device from the interface using the time intervals measured by the internal clock in the interface, thereby controlling the at least one device, wherein the apparatus is a semiconductor-processing apparatus, wherein the at least one device includes multiple devices arranged in parallel with respect to the interface, and wherein the interface is a Peripheral Component Interconnect (PCI) board.

2. A method for controlling an apparatus comprising a controller and at least one device controlled by the controller, said controller being provided with an interface for communicating with the at least one device, said interface having an internal clock for measuring time intervals for the communication, said method comprising:

replacing a system clock of an operating system of the controller in a semiconductor process, in which the controller is used for transmitting instructions to the interface, with the internal clock of the interface;

transmitting instructions to the interface from the controller using the time intervals measured by the internal clock substituting for the system clock; and transmitting the instructions to the at least one device from the interface using the time intervals measured by the internal clock in the interface, thereby controlling the at least one device to perform the semiconductor process in a semiconductor-processing apparatus.

3. The method according to claim 2, wherein the instructions are transmitted to the interface in cycles.

4. The method according to claim 2, wherein the at least one device includes multiple devices arranged in parallel with respect to the interface.

5. A method for controlling an apparatus comprising a controller and at least one device controlled by the controller, said controller being provided with an interface for communicating with the at least one device, said interface having an internal clock for measuring time intervals for the communication, said method comprising:

replacing a system clock of an operating system of the controller, which is used for transmitting instructions to the interface, with the internal clock of the interface;

transmitting instructions related to executing recipes or executing wafer transfer to the interface from the controller using the time intervals measured by the internal clock substituting for the system clock;

transmitting the instructions to the at least one device from the interface using the time intervals measured by the internal clock in the interface, thereby controlling the at least one device for executing the recipes or executing the wafer transfer.

6. A method for controlling an apparatus comprising a controller and at least one device controlled by the controller, said controller being provided with an interface for communicating with the at least one device, said interface having an internal clock for measuring time intervals for the communication, said method comprising:

replacing a system clock of an operating system of the controller, which is used for transmitting instructions to the interface, with the internal clock of the interface;

transmitting instructions to the interface from the controller using the time intervals measured by the internal clock substituting for the system clock; and transmitting the instructions to the at least one device from the interface using the time intervals measured by the internal clock in the interface, thereby controlling the at least one device, wherein the apparatus further includes at least another controller and a main controller which controls the controller and the at least another controller, said method further comprising controlling the controller and the at least another controller by the main controller.

7. The method according to claim 6, wherein the controller is a controller which controls executing recipes and the at least another controller is a controller which controls executing wafer transfer.

8. The method according to claim 6, wherein the main controller and the controller and the at least another controller are connected via an Ethernet.

* * * * *